S. D. LOCKE.
MEANS FOR SUPPORTING AND CARRYING SEARCH LIGHTS.
APPLICATION FILED OCT. 21, 1915.
1,206,871.
Patented Dec. 5, 1916.
2 SHEETS—SHEET 2.
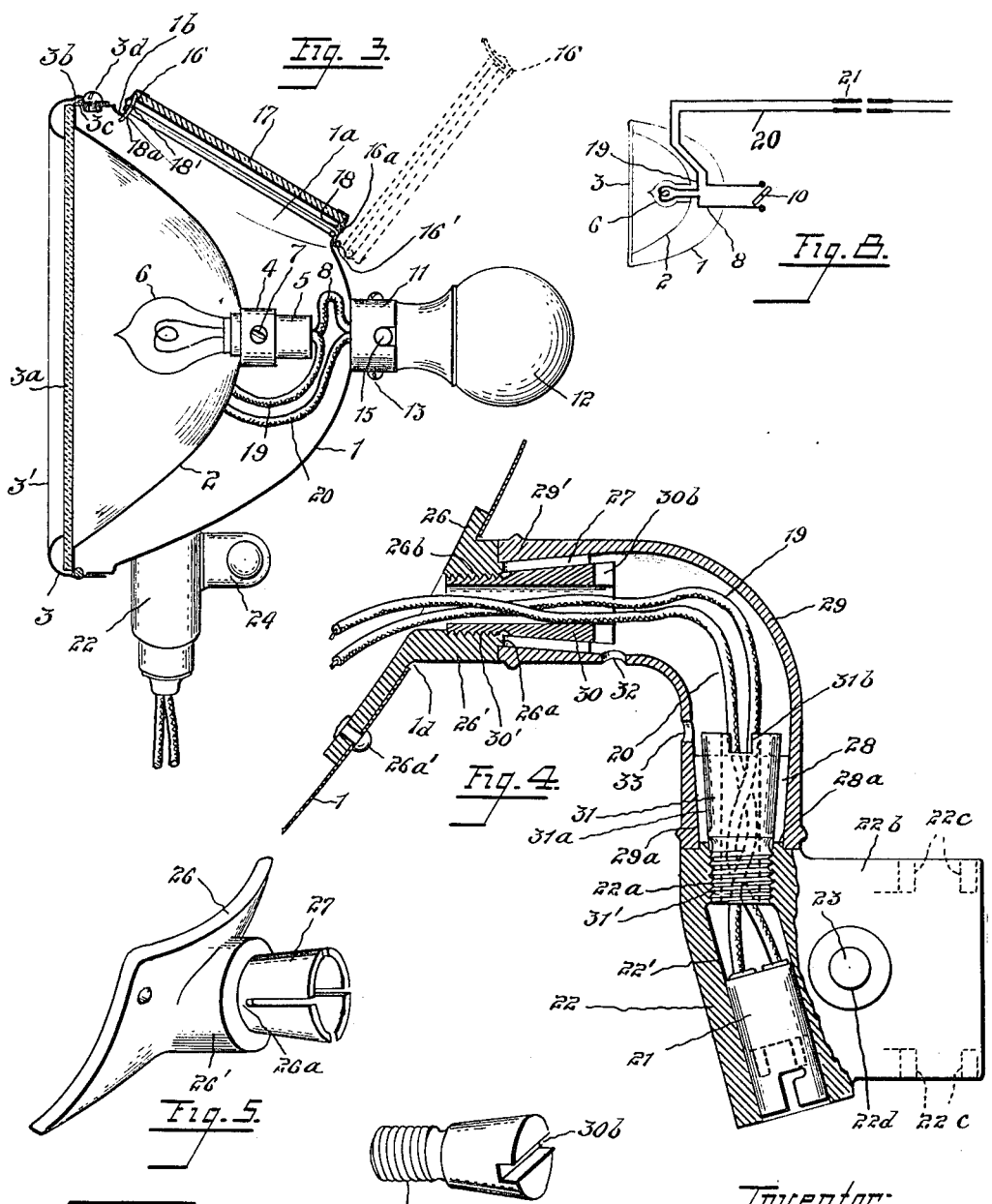

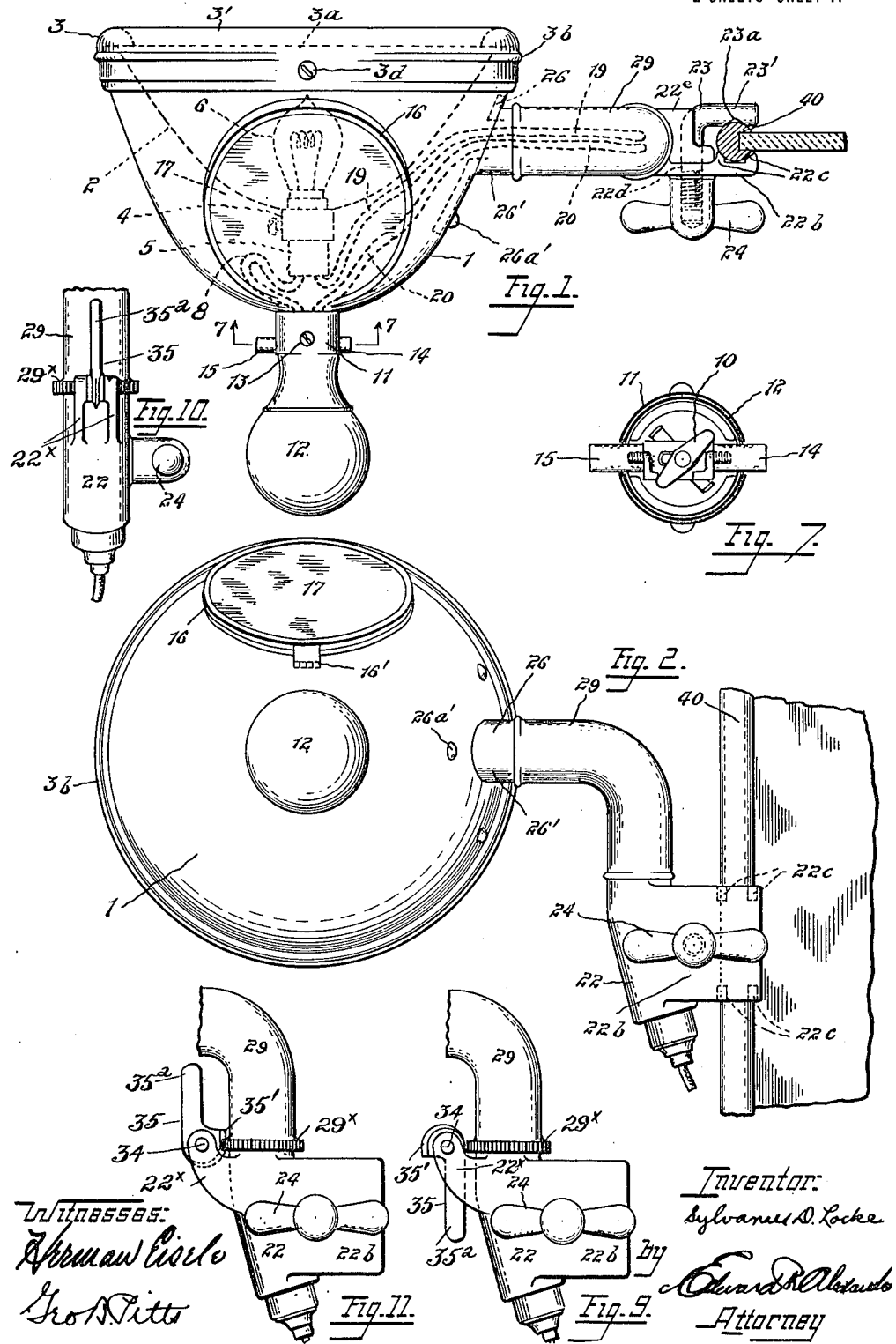

UNITED STATES PATENT OFFICE.

SYLVANUS D. LOCKE, OF BRIDGEPORT, CONNECTICUT, ASSIGNOR OF ONE-HALF TO D. W. HAGGERTY, OF BRIDGEPORT, CONNECTICUT.

MEANS FOR SUPPORTING AND CARRYING SEARCH-LIGHTS.

1,206,871. Specification of Letters Patent. Patented Dec. 5, 1916.

Application filed October 21, 1915. Serial No. 57,027.

*To all whom it may concern:*

Be it known that I, SYLVANUS D. LOCKE, a citizen of the United States, residing at Bridgeport, in the county of Fairfield and State of Connecticut, have invented certain new and useful Improvements in Means for Supporting and Carrying Search-Lights, of which the following is a specification.

This invention relates to improvements in and means for supporting and carrying searchlights.

More particularly it has to do with a searchlight for attachment to the windshield of an automobile and the mechanism for effecting such attachment, whereby the lamp may be used either for searchlight purposes supported on the wind shield or removed therefrom and used as a trouble lamp about the vehicle.

My invention also has to do with the concealing of the electric conductors within the structure as an entirety so as to provide a neat, simple and easily cleaned mechanism.

It further has to do with means for readily obtaining the desired friction against movement of the lamp in any direction of which the universal joint supporting it is susceptible, and regulating such friction at will.

It further has to do with the disposing of a lamp operating handle and switch in such relation to each other that the lamp may be swung in any direction of which it is capable by one hand of the operator and at the same time the switch may be readily operated to throw on or off the light by the same hand.

My invention further contemplates the idea of having auxiliary means for holding the friction controlled engaging elements of a joint against turning relative to each other when it is desired for any reason to hold them for any given time in fixed relation to each other.

Another object of my invention is to provide a simple and effective clamping device which readily may be detachably secured to a suitable support or standard.

Other objects of my invention will be obvious to one skilled in the art from the description and disclosure of an embodiment thereof which I have herein selected for the purposes of illustration.

Figure 1 is a top plan view of mechanism embodying my improvements, the same being illustrated as attached to one of the standards of a wind shield. Fig. 2 is a rear end elevation of the parts shown in Fig. 1. Fig. 3 is a section through the lamp, the mirror door opened being shown in dotted lines. Fig. 4 is a section on the axis of the universal joint. Figs. 5 to 11 inclusive, illustrate details.

In the drawings, 1 indicates a lamp body or shell of any suitable shape. The one illustrated is substantially shaped like one end section of a parabola, so as suitably to receive and support a parabolic reflector 2.

3 is a front closure or door for the lamp comprising an annular section 3', preferably of metal, and a glass section 3ª. The section 3' may be grooved as indicated at 3ᵇ to receive a split clamping ring 3ᶜ of well-known construction. The ring 3ᶜ serves to hold the reflector 2 and glass 3ª properly within the door 3, and screws 3ᵈ or any other suitable means may be used for connecting and holding the door 3 detachably connected to the front end of the shell 1 which extends into it. Extending rearwardly from the reflector 2 and carried thereby is a boss 4 which receives the socket 5 for the electric bulb 6.

7 is a screw carried by the boss 4 and arranged to engage and hold the socket 5 within the boss 4. This construction facilitates adjustment of the socket 5 to and fro relative to the boss 4 so as to bring the lamp into proper focus within the reflector 2. An insulated conductor 8 extends rearwardly from the socket 5 to one terminal of a suitable electric switch 10, which is detachably held in the boss 11 extending rearwardly from the center of the shell 1.

12 is an operating handle which is either rigidly or detachably secured to the boss 11. In the illustrated embodiment of my invention I have shown this handle secured to the boss by screws 13, the inner ends of which engage and hold the switch 10 in place. Suitable openings through the boss 11 and handle 12 are provided for the switch operating extensions 14, 15. These extensions are preferably made of some kind of insulating material and are connected to a reciprocating device of any well-known character for operating a standard type of switch, so that pressing the extension 14, for example, inwardly, will cause the switch to close the electric circuit to the bulb and will force outwardly the extension 15, whereas pressing the latter extension inwardly will cause the circuit to be opened by the switch and the forcing outwardly at the same time of the extension 14, in a well-known manner. These extensions, 14, 15, are preferably secured to the reciprocatable switch element by being screwed into place, so that by unscrewing them the switch may be removed inwardly from the boss 11 into the shell without necessitating the disconnection of the handle 12 from the boss 11.

The shell 1 is preferably formed on its upper side with an opening $1^a$ to permit access to the interior thereof, the space between the inner walls of the reflector 2 and shell 1 serving as a receptacle for an emergency or an extension cord or conductors, which may be packed into this space when not in use.

16 is a door for the opening $1^a$. It is preferably hinged at 16' to the shell 1 and is of suitable size to cover and close the opening $1^a$. Where desired the door 16 may be formed to carry a mirror 17, as illustrated in the drawings. When this is done, the metal of the door frame preferably is grooved as indicated at $16^a$ to receive a split ring 18 which holds the mirror in position in a well-known manner. In order to provide a spring snap or catch for this door, I utilize a portion of the split ring for holding the mirror in place, as illustrated. A section of the ring is extended at 18' in the form of a closed loop. This section 18' is slightly notched as indicated at $18^a$ and these notches engage with a corresponding raised portion $1^b$ on the shell 1 so that when the door is closed it is held with sufficient pressure to avoid rattling, at the same time permitting easy opening by hand.

19, 20 are electric conductors, the former leading from one terminal of the socket 5 and the latter from one terminal of the switch 10 to terminals, respectively, of a plug receptacle 21, with the electrodes of which they are suitably connected, respectively. This plug receptacle 21 is carried in a hollow bore 22', in a bracket piece 22. This bracket piece has an interior screw-threaded opening $22^a$ extending through its upper end and communicating with the bore 22' so as to permit the extension of the wires 19, 20 to the receptacle 21. $22^b$ is a wall or plate carried by and preferably formed integrally with the bracket piece 22 and extending laterally therefrom.

$22^c$ are pairs of alined lugs extending forwardly from the plate $22^b$.

23 is a clamping bar or rod which extends loosely through an opening $22^d$ in the plate $22^b$ and a boss $22^e$ thereon, this boss near the front end of said bar being grooved to guide and support the front end of said bar and hold it up to its place when in use. This bar or rod 23 at its forward end is bent so as to be, at 23', substantially parallel to the plate $22^b$ and is arranged relative thereto so as to be substantially mid-way between the pair of lugs $22^c$ on the said plate. The rear surface of the part 23' may be notched as indicated at $23^a$ so as to coöperate with the pairs of lugs $22^c$ to engage a standard 40, such as a wind shield standard, which may be of any usual cross-section, and firmly hold the bracket piece 22 thereon. To assist in this purpose the rear end of the clamping bar 23 which extends through the wall $22^b$ is screw-threaded as indicated at $22^c$.

24 is a relatively large wing or thumb nut for engaging the screw-threaded portion of the clamp bar 23 and also the adjacent wall of the plate $22^b$, to effect the clamping of these parts to the wind shield standard.

26 is a bracket plate having a laterally extending hollow boss 26'. This bracket plate is preferably suitably secured to the inside of the shell 1, as by means of rivets $26^{a\prime}$. The boss 26' extends laterally through a suitable opening $1^d$ in the shell 1, and has secured to and extending outwardly from it a hollow split tapered part 27. This tapered part 27 is preferably formed integral with the boss 26'. The bracket 22 has extending upwardly from it a similarly hollow split tapered part 28, preferably formed integral with it. Each of these parts 27, 28 forms one element of an inclosed, tubular, universal joint between the brackets 22 and 26.

29 is a curved tube or sleeve extending between the tapering split sections 27, 28 and adapted at its opposite ends to receive and engage the said sections 27, 28, respectively, and all the bosses $26^a$ and $28^a$ adjacent. The inner walls of this tube near its opposite ends may be slightly tapered, as indicated at 29', $29^a$, the more readily to be engaged by the tapered walls of the coöperating sections 27 and 28.

30 is a hollow tapered plug having at its smaller end a cylindrical screw-threaded section 30' which is fitted into a correspondingly screw-threaded section $26^b$ in the bracket 26. The tapered portion of the plug 30 is adapted to engage the inner walls of the split tapered section 27 to force or press them into engagement with the inner adjacent walls 29' of the tube 29 so as to impart the desired frictional resistance to the turning movement of the elements constituting the joint at this point. 31 is another hollow tapered plug similarly constructed to the plug 30, but having its screw-threaded cylindrical section 31' fitted into the correspondingly screw-threaded section at $22^a$ in the bracket 22 and its tapering portion $31^a$ adapted to engage the split tapered walls of the section 28 to force them into engagement with the coöperating walls 29ª of the tube 29 to establish the desired amount of friction at this part of the joint. The larger end of each plug 30, 31 is recessed as indicated at 30ᵇ, 31ᵇ, respectively.

32 is an opening through the under wall of the tube 29 adjacent to the outer larger end of the plug 30.

33 is an opening through the wall of the tube 29 adjacent to the large end of the plug 31. Each of the plugs 30 and 31 is hollow to permit the passage therethrough of the conductors 19 and 20.

The parts of the complete joint having been assembled as illustrated in Fig. 4 in order to regulate the amount of friction between the parts of the joint at the upper end of the tube 29, the lamp body is turned relative to the tube until the recess 30ᵇ in the plug 30 is alined with the opening 32, whereupon a nail or similar article is introduced through the opening 32 and caused to engage with the walls of the recess 30ᵇ. If the joint operates too stiffly at this point the lamp body is turned in one direction with reference to the tube 29, whereas if it operates too freely, it is turned in the opposite direction, the plug 30 by moving outwardly relative to the boss 26', serving to relieve the frictional engagement between the plug 27 and tube 29 and by moving inwardly to increase it. Should the joint at the other end of the tube 29 require adjustment, in this instance the tube is turned relative to the plug 31, until the opening 33 alines with the recess 31ᵇ in the top of the plug 31, whereupon a nail or suitable tool is inserted through the opening 33 and into engagement with the walls of the recess 31ᵇ and the adjustment regulated in the manner as above suggested with regard to the movement of the plug 30.

The operation of the device as an entirety will be readily understood. The clamp consisting of the bracket 22, rod 23 and nut 24 is substantially a universal one for all well known wind shield standards, for example either of round, elliptical, tapered or rectangular cross-section, so that this bracket carrying the entire structure may be secured readily and firmly to the wind shield standard. The plug receptacle 21 is of standard construction. The corresponding plug for this receptacle may be electrically connected to any suitable source of direct current. The practice is to have such plug connected to a battery on the vehicle and the plug disposed at the dash so as readily to be inserted into the receptacle 21. The electrical circuit is completed from the receptacle 21 by the conductors 19, 20, the switch 10 and conductors 8 and 9 to the bulb 6. The operating extensions 14, 15, for the switch are arranged most conveniently. The operator with his hand on the handle 12 may turn or throw the lamp in any direction he may desire and switch on and off the current to the bulb at will with the same hand and during the same operation of throwing the searchlights from one point to another.

It will be noted that all of the electrical connections between the receptacle 21 and bulb 6 are concealed from view and at the same time thoroughly protected. The hollow universal joint between the brackets 22 and 26 is extremely neat in appearance, strong, simple and durable and at any time may be readily adjusted at either end to cause the desired friction for the proper operation of the device as an entirety.

In the event that it is desired to use the device as a trouble lamp, it may be quickly detached from the wind shield, the trouble extension removed from the space between the reflector and lamp body, through the opening 1ª in the latter normally closed by the door 16. One end of the extension may be connected to the plug which ordinarily fits into the receptacle 21, or a like plug suitably placed on the machine, and the other end may be inserted in said receptacle, 21, so that the lamp may be carried about the vehicle at will. The construction of the lamp lends itself admirably for the simple adjustment of the bulb 6 to obtain the proper focus within the reflector 2.

Since no part of the tapered portions of the plugs 30 and 31 comes into frictional engagement with the tube 29, there is no tendency in the operation of the device for these plugs to change their position within the slotted tapered sections with which each engages, respectively. Instead they tend to maintain any position to which they may be adjusted under all normal circumstances of operation of the device as an entirety. Furthermore the tighter the adjustment is made at either end of the tube 29, the closer is the fit established between the tube and the adjacent boss, practically insuring watertight connections at the ends of the tube and a very neat appearance at all times. When desired, as shown in the drawings, the door 16 may be provided with a mirror 17. When this is done the operator may swing the body of the lamp so as to dispose this mirror to disclose objects behind the operator.

That part of the universal joint which is associated with the hollow boss 26' permits the movement of the lamp about a horizontal axis, while that part of said joint which is associated with the bracket piece 22 permits the swing of the lamp about a vertical axis, and after the lamp is once adjusted with the mirror 17 properly facing the driver it becomes quite essential that said lamp shall have no swinging movements about a vertical axis such as would be caused by sudden variations in the speed of the car. Such movements about a vertical axis would naturally occur frequently and the bent tube 29 and the lamp would be constantly swinging and thus throwing the mirror out of proper position with respect to the eye of the driver. I have therefore provided special means for locking that part of the joint which controls this movement about a vertical axis. For this purpose, as shown in Figs. 9 to 11, inclusive, the lower end of the elbow 29 may be formed with a rib or annular flange as indicated at 29×, and the outer surface of this flange may be suitably knurled or indented. Where this construction is employed, I preferably have formed upon the bracket 22 a pair of outwardly extending ears 22×, between which at 34 is pivoted a cam lever 35 having a sharp edge cam 35′ and operating handle 35ª. The sharp edge 35′ of said cam is adapted to enter between teeth of the knurled portion 29× on the elbow 29 and engage the walls thereof so as to hold said elbow from turning after it has been adjusted in any desired position. The relation of the handle 35ª, cam 35′ and the pivot 34 is such that should the cam become unlocked from or loose between a pair of teeth on the rib 29×, the weight of the arm 35ª will swing the cam out of operative relation to the teeth, so that in vibration or oscillation of the elbow 29 under such circumstances will not tend to strip the teeth from the rib 29×.

Conditions where it is desirable to employ the combined frictionally controlled joint and auxiliary means for securing elements of the joint in substantially fixed relation to each other may arise in connection with the use of a mirror on a searchlight of this character. Where such mirror is used, its adjustment about a vertical axis relative to the wind shield, when once properly established, may in some instances to advantage be fixed, particularly for daytime running on poorly surfaced roads.

While in the drawings I have shown the outside walls of the split hollow sections 27 and 28 to be tapered and to coöperate with tapered portions of the inner walls at the ends of the tube 29, it will be understood that these coöperating frictional surfaces may be of any desired shape which will enable them to perform their requisite function in the joint. The tapering surfaces which I have selected to show in the illustrated embodiment of my invention between these frictionally engaging parts, serve, in addition affording desired frictional resistance, to draw the parts of the joint together, which is an advantage in keeping dirt, water and foreign substances out of the joint.

What I claim is:

1. In a device of the character described, a tube bent to provide a vertical portion and a horizontal portion, a bracket plate rigidly secured to a lamp casing and partaking of all movements thereof and having integral therewith a hollow boss, adjustable friction devices extending within said horizontal portion and boss for pivotally connecting said boss to said portion and for imposing more or less friction on the pivotal movements of said boss, whereby said casing may at all times be swung about a horizontal axis, a plate secured to a windshield of an automobile and having integral therewith a hollow bracket piece, and adjustable friction devices extending within said bracket piece and the vertical portion of said tube for pivotally connecting said tube to said piece and for imposing more or less friction on the pivotal movements of said tube, whereby said tube may at all times be swung about a vertical axis.

2. In a device of the character described, a bent tube, a bracket plate adapted to be secured to a lamp casing and having a hollow boss, a plate adapted to be secured to a windshield of an automobile and having a hollow bracket piece, the ends of said tube having swiveled joint relation with said boss and bracket piece respectively, hollow resilient split sections within each joint, and hollow tapering plugs capable of adjustment within said sections, said joints provided with lateral openings whereby access is had to said plugs.

3. In a device of the character described, a casing and a reflector disposed to form between them a receptacle for an emergency cord, the casing having a door to permit access to said receptacle, a mirror in said door, and means for normally securing said casing to a windshield of an automobile with a universal joint between said casing and windshield.

4. In a device of the character described, the attaching bracket including a laterally extending plate having projecting from one face thereof opposite pairs of alined spaced isolated lugs having a clearance therearound in all directions, said plate formed with a boss having an open elongated circular bearing extending in a plane at right angles to the plate and intermediate said bracket and lugs, a clamp bar loosely extending through said plate and housed in said bearing and having its front end extending at right angles to and spaced from said plate and overhanging said lugs, and means for operating said clamp bar.

5. In a device of the character described, a tubular member formed to provide a vertical portion and a horizontal portion; a bracket plate rigidly secured to a lamp-casing and partaking of all the movements thereof and having integral therewith a hollow, horizontally-disposed boss; a plate adapted to be secured to a fixed portion of an automobile and having integral therewith a hollow bracket piece, said tubular member having a swivel connection at its horizontal and vertical extremities to said boss and bracket piece, respectively; means associated with said swivel connections for imposing friction thereon to hold the parts in any rotative position; and means for securing adjustment of said friction means.

In testimony whereof I affix my signature in the presence of two witnesses.

SYLVANUS D. LOCKE.

Witnesses:
 CHAS. PARKER,
 J. V. CORNWALL.